P. MÜLLER.
EVAPORATOR.
APPLICATION FILED JAN. 18, 1912.
1,033,609.
Patented July 23, 1912.
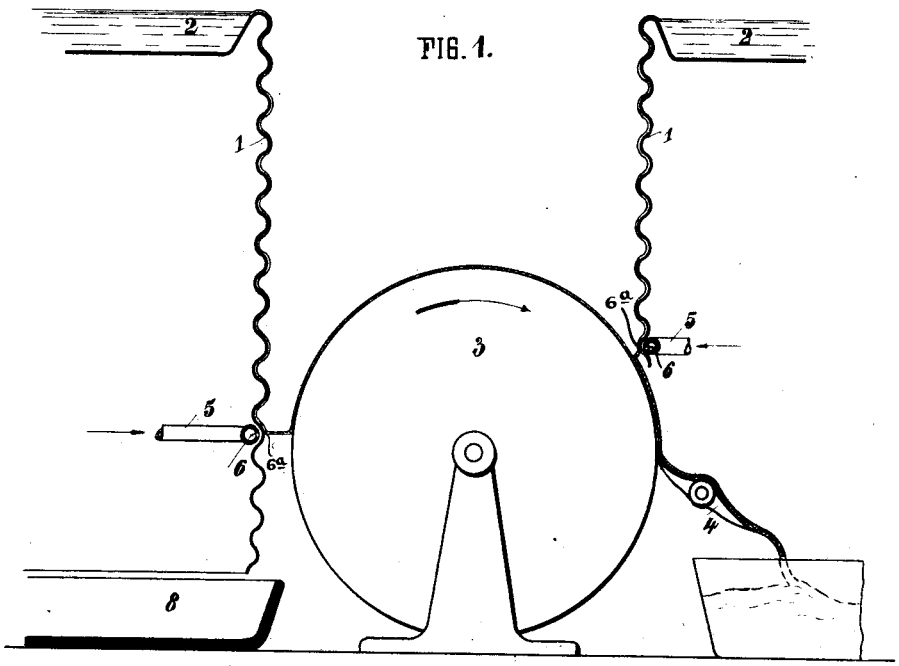
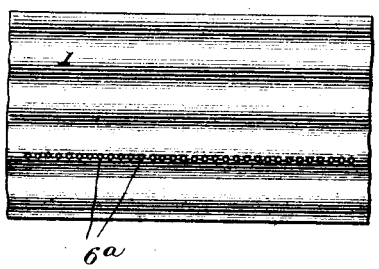
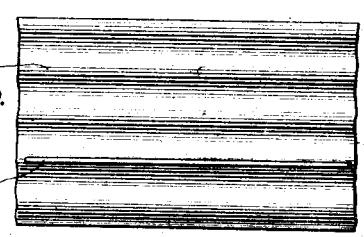
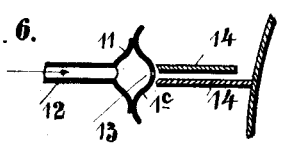
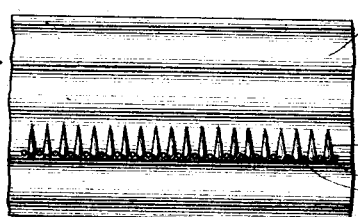
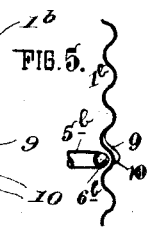
Witnesses
C. N. Walter
L. G. Anger
Inventor
Philipp Müller
by
Attorney

UNITED STATES PATENT OFFICE.

PHILIPP MÜLLER, OF VILBEL, GERMANY.

EVAPORATOR.

1,033,609.

Specification of Letters Patent.  Patented July 23, 1912.

Application filed January 18, 1912. Serial No. 671,980.

*To all whom it may concern:*

Be it known that I, PHILIPP MÜLLER, a subject of the Grand Duke of Hesse, residing at Vilbel, in Hesse, Germany, have invented certain new and useful Improvements in Evaporators, of which the following is a specification.

The object of this invention is to provide improved means for applying thin films or streaks of liquid (for example milk, paint and the like) or powder to rotating drums, for purposes of evaporation, condensation, drying or the like, for example for condensing milk to a paste or to a dry state in which it can be powdered.

The invention is illustrated in the accompanying drawing and will be described hereinafter more particularly with reference to the treatment of milk by evaporation.

In the drawing:—Figure 1 is an elevation of the apparatus, partly in section, viewed from one end of the drum, and Fig. 2 is a front view of part of the said apparatus. Figs. 3 and 4 are views similar to Fig. 2, illustrating two modifications of the device, and Fig. 5 is a cross section of the construction shown in Fig. 4. Fig. 6 is a cross section illustrating another modification.

Referring in the first instance to Fig. 1, the parts 1, 1 are two corrugated trickle walls, down which thin films of milk flow from pans 2 to the heated, revolving drum 3. A scraper 4 is arranged adjacent to the surface of the drum 3, for removing the film of dry or pasty condensed milk. Behind each wall 1 is arranged a pipe 5, part of which extends horizontally along the wall and has a series of perforations 6 facing the wall. The wall has a similar horizontal series of perforations $6^a$, as shown in Fig. 2, so that compressed air or other gaseous fluid forced through the pipe 5 and issuing from the holes 6 can pass in thin streams through the holes $6^a$. These streams of gaseous fluid act on the milk trickling down the wall 1, and project the same on to the surface of the drum 3. A pan 8 may be placed below the wall, as shown in Fig. 1, to receive whatever milk trickles past the holes $6^a$.

In the modification shown in Fig. 3 the trickle wall $1^a$ has a horizontal slot 7, instead of a series of holes, and an air tube with a similar slot is in this case used behind the wall, so that the liquid is thrown on to the drum in the form of a thin sheet, instead of in thin streams or jets of spray.

In the construction shown in Figs. 4 and 5 the trickle wall $1^b$ has a series of upwardly bent, wedge-shaped projections 9 located between holes 10, and air is projected through these holes from a pipe $5^b$ having holes $6^b$. The holes 10 are spaced somewhat farther apart than the holes $6^a$ shown in Fig. 2, and the projections 9 deflect the milk, flowing down the wall 1, toward the said holes 10, so that thicker jets of liquid are projected on to the drum.

In the construction shown in Fig. 6 the trickle wall $1^c$ has holes 13 behind which a strip of metal 11 is soldered, at its edges, to the wall, so as to form an air channel, into which air is forced through a pipe 12. Horizontal guide plates of glass 14 or other suitable material are placed between the holes 13 and the surface of the drum, to guide the jets of liquid to the latter.

It is not essential to have two walls 1, and the trickle wall or walls may be smooth instead of corrugated, and may be inclined. The scraper may be arranged to deflect the film of condensed milk on to another drum in such manner that the film surface which was in contact with the first drum lies outside on the second drum. The milk may be separated into cream and poor milk, before the treatment, the poor milk being then treated on a drum heated to a higher temperature than that on which the cream is treated, the resultant films of condensed milk and cream being subsequently laid one upon the other on a third drum or upon one of the drums on which they have been dried.

If two or more projecting appliances are used in conjunction with a single drum they may be used for projecting different kinds or qualities of liquid on to the drum, for example cream and skim milk, so that the film of cream lies on the film of skim milk on the drum, and is thus subjected to a lower drying temperature. Mixtures, emulsions and pastes may be produced by using a plurality of projecting appliances, as described.

Air used for projecting the liquid on to the drum, as described, may be cleansed, moistened, dried, heated or cooled before it acts on the liquid, and may receive admixtures of various kinds. The air pressure and the distance between the wall and drum are regulated according to the nature of the liquid to be dealt with and the thickness of the films. The pans 2 may be made disconnectible so that fresh supplies of liquid or supplies of different liquid can be quickly brought into position for treatment.

What I claim as my invention and desire to secure by Letters Patent of the United States is:—

1. Evaporating apparatus comprising a rotatable drum, an apertured trickle wall adjacent said drum, and means for directing gaseous fluid under pressure through said apertured wall toward said drum.

2. Evaporating apparatus comprising a rotatable drum, a horizontally corrugated trickle wall having a series of perforations at the crest of one of its corrugations adjacent to the drum, a strip fixed to said wall behind the perforated corrugation so as to form a channel extending along the wall, and means for directing gaseous fluid under pressure into said channel so that streams of said fluid are projected through said perforations toward the drum.

3. Evaporating apparatus comprising a rotatable drum, a trickle wall having a horizontal series of perforations adjacent said drum, projections fixed to said wall between the perforations, and means for directing gaseous fluid under pressure through said perforations and between said projections toward the drum.

4. Evaporating apparatus comprising a rotatable drum, an apertured trickle wall adjacent said drum, means for directing gaseous fluid under pressure through said apertured wall toward said drum, and guide-plates disposed between said drum and the apertured part of said wall.

In witness whereof I have signed this specification in the presence of two witnesses.

PHILIPP MÜLLER.

Witnesses:
  JEAN GRUND,
  CARL GRUND.